United States Patent Office 3,505,281
Patented Apr. 7, 1970

3,505,281
LINEAR POLYESTERS FROM 2,2-BIS(4-HYDROXY-PHENYL)-PROPANE AND BIS(4-CARBOXYCYCLOHEXYL)ACIDS
James Dwight Hodge, Grifton, N.C., assignor to E. I. du Pont de Nemours and Company, Wilmington, Del., a corporation of Delaware
No Drawing. Filed Aug. 16, 1966, Ser. No. 572,692
Int. Cl. C07c 61/12; C08g 17/08
U.S. Cl. 260—47                    5 Claims

ABSTRACT OF THE DISCLOSURE

Poly(isopropylidene-4,4'-diphenylene dodecahydro-4,4'-bibenzoate) and related polymers, from bis(4-carboxycyclohexyl)methane, bis(4-carboxycyclohexyl)ethane and bis(4-carboxycyclohexyl)propane, are shown to be stable, high-melting polyesters suitable for preparing molded articles having excellent light stability. Preparation of the alicyclic acids and the polyesters are illustrated.

---

This invention relates to a novel class of polyesters and, more specifically, pertains to polyesters derived from dihydroxy compounds containing a plurality of aromatic rings in combination with dicarboxylic acids containing a plurality of aliphatic rings.

In accordance with this invention, it has been found that moldable linear polyesters may be prepared from 2,2-bis(4-hydroxyphenyl)propane and certain alicyclic acids or ester-forming derivatives thereof. Polyesters of this class are stable at temperatures above their melting points, rendering them suitable for the preparation of molded articles, films, filaments, tapes and other shaped structures. Structures prepared from these polyesters exhibit excellent light stability in contrast to the poor light stability of polyesters derived from polyphenyl glycols and aromatic acids.

The novel linear polyesters of the invention may be illustrated as possessing recurring units of the following structural formula:

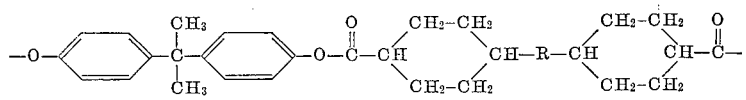

in which R is a direct linkage or divalent aliphatic radical from the class consisting of methylene, ethylene and isopropylidene. These polyesters are derived from 2,2-bis(4-hydroxyphenyl)propane and a two-ring alicyclic acid from the group consisting of dodecahydro-4,4'-bibenzoic acid, bis(4-carboxycyclohexyl)methane, 1,2-bis(4-carboxylcyclohexyl)ethane, and 2,2-bis(4-carboxycyclohexyl)propane. Usually it is preferred that the linear polyester have an intrinsic viscosity of at least 0.25 as measured in solution at 25° C. in 1 part trifluoroacetic acid and 3 parts methylene chloride (by volume).

A convenient method for preparing the polyesters of the invention involves reaction of the polyphenyl diol with an equimolecular amount of the acid chloride of the alicyclic acid. Such a reaction is usually carried out in solution in an inert solvent at an elevated temperature. An inert gas may be bubbled through the solution to assist in removal of HCl. Alternatively, the polyesters of the invention may be prepared by the general method described in U.S. Patent No. 2,595,343, dated May 6, 1952, where the polyphenyl glycol is first converted to the diacetate, following which an ester interchange reaction is carried out between the diacetate and the alicyclic acid. Polymerization is completed under reduced pressure at an elevated temperature. The ester interchange and polymerization may be carried out in the presence of suitable catalysts such as sodium acetate, potassium acetate or p-toluenesulfonic acid.

It is to be understood that mixtures of said alicyclic acids may be used if desired. Also, minor amounts (i.e., up to 15 mole percent) of other dihydroxy compounds and other dicarboxylic acids may be present e.g., suitable other dihydroxy compounds include hydroquinone, 1,3-dihydroxybenzene and 4,4'-dihydroxybiphenyl, and other dicarboxylic acids include hexahydroterephthalic acid, terephthalic acid, 2,2,5,5-tetramethyladipic acid, decahydronaphthalene-2,6-dicarboxylic acid and bibenzoic acid.

The expression "polymer melt temperature" (PMT) employed with respect to the products of this invention is the minimum temperature at which a sample of the polymer leaves a wet molten trail as it is stroked with moderate pressure across a smooth surface of heated metal. "Polymer melt temperature" has sometimes in the past been referred to as "polymer stick temperature."

The term "intrinsic viscosity," as used herein, is defined as the limit of the fraction $\ln(r)/c$, as $c$ approaches 0, where $r$ is the relative viscosity, and $c$ is the concentration in grams per 100 ml. of solution. The relative viscosity $r$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

Where not otherwise available, the allicyclic acids used in the preparation of the polyesters of this invention may be obtained by hydrogenating the corresponding aromatic acid or acid ester. For example, dimethyl-4,4'-bibenzoate may be hydrogenated in the presence of platinum oxide to give dimethyl dodecahydro-4,4'-bibenzoate.

The alicyclic acids used in the preparation of the polyesters of this invention are known to exist in three isomeric forms. These forms are designated cis,cis- ("c,c"-), trans,trans- ("t,t"-), and cis.trans- ("c,t"-). These isomers are illustrated by the following structural formulas for dodecahydro-4,4'-bibenzoic acid.

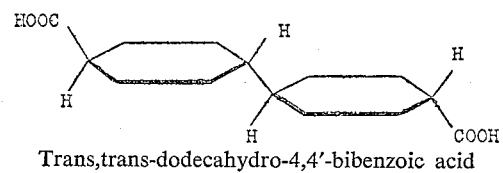
Trans,trans-dodecahydro-4,4'-bibenzoic acid

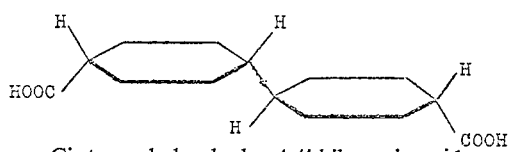
Cis,trans-dodecahydro-4,4'-bibenzoic acid

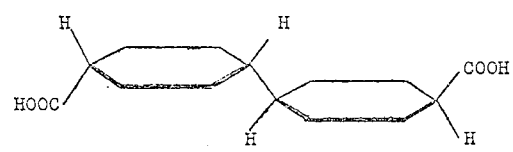
Cis,cis-dodecahydro-4,4'-bibenzoic acid

As shown in the examples, the proportion of these isomers in a polyester of the alicyclic acid has a significant effect on the polymer melting temperature.

The alicyclic acid may be converted, by heating, to the most stable isomer, which is normally the trans, trans-isomer. Some methods of preparation produce mixtures of the isomers, and these may be separated by fractional crystallization or other procedures.

PREPARATION OF ALICYCLIC ACIDS

The following discussion will serve to describe the preparation of dodecahydro-4,4'-bibenzoic acid, its dimethyl ester and its diacid chloride, these being representative of the alicyclic acid compounds suitable for use in preparing the polyesters of this invention. The discussion includes the separation of certain pure geometrical isomers and selective methods for preparing certain specific geometrical isomers.

(a) Hydrogenation of dimethyl 4,4'-bibenzoate

To a solution of 30 grams of dimethyl 4,4'-bibenzoate in 150 cc. of acetic acid is added 0.5 gram of finely divided platinum oxide (Adams catalyst), after which the mixture is hydrogenated in a Parr shaker for 6 hours at 45° C. under an atmosphere of 50 p.s.i. of hydrogen. The catalyst is then filtered off and the acetic acid is neutralized by adding aqueous sodium carbonate. The product is dimethyl dodecahydro-4,4'-bibenzoate, a solid of low melting point.

(b) Alternate hydrogenation procedure

Hydrogenation of dimethyl 4,4'-bibenzoate in dioxane solution is carried out as in part (a), except that ruthenium oxide is substituted for the platinum oxide and high pressure apparatus is used (hydrogen at 5000 p.s.i.). A low melting ester product, dimethyl dodecahydro-4,4'-bibenzoate, is obtained.

Similarly, dipotassium-4,4'-bibenzoate may be hydrogenated in aqueous solution at 5000 p.s.i. to form dipotassium dodecahydro-4,4'-bibenzoate; or an aqueous slurry of bibenzoic may be hydrogenated to form dodecahydrobibenzoic acid.

(c) Trans,trans-dimethyl dodecahydro-4,4'-bibenzoate

Ninety grams of dimethyl dodecahydro-4,4'-bibenzoate, prepared as described in part (a), is dissolved in 500 cc. of methanol and 200 cc. of water. To the solution is added 80 grams of sodium hydroxide, after which the solution is refluxed overnight. The reaction mixture is worked up by distilling off the methanol and acidifying the aqueous solution with concentrated hydrochloric acid. The solid so obtained, dodecahydro-4,4'-bibenzoic acid, is washed and dried, the yield being 84 g. The acid melts over a wide range, 220–350° C.

The acid is isomerized by placing it in a container under a vacuum of 15 mm. of mercury and heating it for 1 hour at 250° C., then for 2 hours at 300° C. The resulting product has a melting point of 355° C.

A solution of 84 g. of the isomerized acid in 800 cc. of methanol is refluxed overnight with 20 cc. of concentrated sulfuric acid and poured on ice, after which the product is filtered off and washed. After two recrystallizations from a mixture of 90 parts of methanol and 10 parts of water, the product melts at 116° C. Gas-liquid chromatography of a sample (4 ft. column of high molecular weight polyethylene glycol wax at 250° C.) establishes that all of the material passes through in a single peak, indicating that the product is the pure geometrical isomer, trans,trans-dimethyl dodecahydro-4,4'-bibenzoate (Ref.: Fichter & Holbro, Helv. Chim. Acta, 21, 141, 1938).

(d) Identification of isomeric esters

The ester obtained by the high pressure hydrogenation procedure of part (b) is subjected to the gas-liquid chromatography. Three peaks are observed, amount to 60%, 35% and 5% of the product, respectively. When pure trans,trans-dimethyl dodecahydro-4,4'-bibenzoate, prepared as described in part (c), is added to the sample and another gas-liquid chromatography determination is made, the third peak is enhanced. A sample of the ester product from part (b) is then heated for 24 hours with sodium methoxide in refluxing methanol gas-liquid chromatography of the resulting ester indicates that the isomer composition has been greatly changed; the first, second, and third peaks amounting to 5%, 35% and 60%, respectively. Based on these data, the order of disappearance of the peaks, corresponds to the cis,cis-, cis,trans-, and trans,trans-isomers, respectively; and the esters are correspondingly designated hereinbelow as the "c,c-", "c,t-" and "t,t-" isomers, respectively.

The ester product of part (a) is subjected to gas-liquid chromatography and it is determined that the isomer composition is 45% "c,c-", 45% "c,t-" and 10% "t,t-", based on the above designation.

(e) "c,c-" Dimethyl dodecahydro-4,4'-bibenzoate

A sample of dimethyl dodecahydro-4,4'-bibenzoate prepared by high pressure hydrogenation as described in part (b) is recrystallized from an approximately 10% solution in a mixture of 90 parts of methanol and 10 parts of water. As determined by gas-liquid chromatography, the resulting crystals correspond to a pure sample of "c,c-" dimethyl dodecahydro-4,4'-bibenzoate as designated in part (d) above. The melting point of the ester is 98° C.

(f) "c,t-" Dimethyl dodecahydro-4,4'-bibenzoate

The mother liquor remaining after separation of the "c,c-" isomeric ester in the procedure of part (e) is analyzed by gas-liquid chromatography, and it is found that the ratio of isomers remaining in it is 20% "c,c-", 65% "c,t-" and 15% "t,t-". Sodium hydroxide is added to the solution and the mixture is refluxed over night. Sodium chloride is added to the solution and the resulting precipitate (sodium salt of the "t,t-" isomer of the acid) is filtered off. The remaining acid obtained upon acidification is recrystallized from aqueous acetic acid and the product is then esterified by refluxing over night in methanol in the presence of concentrated sulfuric acid. The crystals obtained upon recrystallization from solution in 90 parts of methanol and 10 parts of water melt at 56° C. Gas-liquid chromatography indicates that it comprises "c,t-"dimethyl dodecahydro-4,4'-bibenzoate of 80% purity.

(g) Acid chloride of "c,c-"dodecahydro-4,4'-bibenzoic acid

The free "c,c-" acid obtained by saponification of the "c,c-"dimethyl dodecahydro-4,4'-bibenzoate described in part (e) is added to a ten-fold excess of thionyl chloride and refluxed for 5 hours. The excess thionyl chloride is removed by aspiration at a moderate temperature, and the residue dissolved in dry hexane and crystallized by cooling. The pure diacid chloride of "c,c-"dodecahydro-4,4'-bibenzoic acid obtained has a melting point of 80–81° C.

(h) Hydrogenation of 1,2-bis(4-carbomethoxyphenyl) ethane

The procedure of part (a) is repeated, substituting 1,2-bis(4-carbomethoxyphenyl)ethane for dimethyl 4,4'-bibenzoate and carrying out the hydrogenation at 40° C. to produce a mixture of geometrical isomers of 1,2-bis(4-carbomethoxycyclohexyl)ethane.

The mixture of isomeric esters is recrystallized from methanol to obtain a pure geometrical isomer which is designated as the "c,c-"isomer based on a gas-liquid chromatography determination. This isomer has a melting point of 80° C.

A portion of the mixture of isomeric esters is also saponified to the acid, heated and re-esterified to the dimethyl ester in accordance with the general procedure of part (c). The resulting "t,t-"1,2-bis(4-carbomethoxycyclohexyl)ethane, identified by chromatography, is found to have a melting point of 126° C.

This invention is further illustrated but is not intended to be limited by the following examples in which parts and percentages are by weight, unless otherwise specified.

EXAMPLE 1

A mixture of 0.0500 mole of the diacetate of 2,2-bis(4-hydroxyphenyl)propane, 0.0500 mole of "c,c-"bis(4-carboxycyclohexyl)methane and 0.15 g. of sodium acetate trihydrate is placed in a polymer tube fitted with a heater, a vacuum connection, and a glass-capillary nitrogen bubbler. The tube is heated to 260° C. for 1 hour and then to 280° C. for an additional 1 hour while acetic acid is removed by distillation. Then the tube is connected to a vacuum source and heating continued while the pressure is reduced to 0.3 ml. of mercury. After 3 hours at low pressure, the temperature is raised to 300° C. for 30 minutes. The product obtained, after cooling and removing the glass tube, is found to be a tough, light-amber polymer having an intrinsic viscosity of 0.63 and a polymer melting temperature of 240° C. Drawable fibers may be pulled from the melt. Films melt pressed from the polymer are found to be tough and flexible. The films, as prepared, are amorphous and found to resist efforts to cause them to crystallize.

The polymer is identified as poly(isopropylidene-4,4'-diphenylene-4,4'-dicyclohexylmethanedicarboxylate). By hydrolyzing the polymer, isolating the free acid isomers, converting them to the dimethyl esters, and analyzing the isomer mixture by chromatographic means, it is found that the polymer is made up of a mixture of isomers in the following ratio: 2% "c,c-", 14% "c,t-" and 84% "t,t-".

EXAMPLE 2

A round-bottomed flask fitted with stirrer, reflux condenser, drying tube, and glass-capillary nitrogen bubbler is charged with dichlorobenzene and brought to a boil. To the dichlorobenzene is then added equimolecular amounts of 2,2-bis(4-hydroxyphenyl)propane and the acid chloride of "c,c-"dodecahydro-4,4'-bibenzoic acid. The solution is refluxed for 24 hours with dry nitrogen being bubbled through to aid in the removal of HCl. At the end of the reaction the polymer is precipitated in hexane, redissolved in methylene chloride and reprecipitated in ethanol in a high speed mixer. The precipitated polymer is then recovered by filtration and dried in an oven. The polymer is found to have a polymer melting temperature of 235° C. and an intrinsic viscosity of 0.47. Flexible fibers may be drawn from the molten polymer.

The polymer prepared above is melt pressed into films which are tough and flexible. The films are amorphous as prepared and are not easily crystallized.

The polymer is identified as poly(isopropylidene-4,4'-diphenylene dodecahydro-4,4'-bibenzoate). By hydrolyzing the polymer, isolating the free diacids, converting them to the dimethyl esters, and subjecting them to chromatographic analysis, it is found that the polymer is composed of 42% "c,c-" isomer, 33% "c,t-"isomer and 25% "t,t-" isomer.

EXAMPLES 3 TO 17

In the following examples, 2,2-bis(4-hydroxylphenyl) propane is polycondensed with various two-ring alicyclic acids using the same molar ratio of reactants and the general procedure described in Example 1.

2,2-BIS(4-HYDROXYPHENYL)PROPANE POLYESTERS

| Example | Acid employed | Intrinsic viscosity | PMT, °C. | Isomer ratio in polymer, c,c/c,t/t,t |
|---|---|---|---|---|
| 3 | "c,c"-dodecahydro-4,4'-bibenzoic acid | 0.51 | 250 | 6/39/55 |
| 4 | do | 0.75 | >350 | 1/15/84 |
| 5 | do | 0.49 | 255 | 4/32/64 |
| 6 | do | 0.57 | 310 | 6/24/70 |
| 7 | do | 0.91 | >350 | |
| 8 | Dodecahydro-4,4'-bibenzoic acid (mixed isomers) | 0.57 | >350 | 4/23/73 |
| 9 | "c,c"-2,2-bis(4-carboxycyclohexyl)propane | 0.53 | 270 | |
| 10 | do | 0.58 | 260 | 4/41/55 |
| 11 | do | 0.55 | 260 | 3/38/59 |
| 12 | "c,c"-bis(4-carboxycyclohexyl)methane | 0.77 | 220 | 0/14/86 |
| 13 | do | 0.66 | 240 | |
| 14 | "t,t"-bis(4-carboxycyclohexyl)methane | 0.96 | 245 | 4/40/56 |
| 15 | "c,c"-1,2-bis(4-carboxycyclohexyl)ethane | 0.88 | 275 | 0/10/90 |
| 16 | do | 0.71 | 250 | 2/12/86 |
| 17 | do | 0.73 | 250 | |

EXAMPLE 18

To illustrate the excellent light stability of the polyesters of this invention, films were pressed from representative polymers and exposed to the light from a carbon arc in a Xenotester for periods of 24, 48 and 100 hours. The results are recorded in the table below using a 1–5 scale where 5 indicates no observable break and 1 indicates a very severe break. The performance of these polymers is better appreciated when it is realized that films pressed from a polyester prepared from 2,2-bis(4-hydroxyphenyl) propane and isophthalic acid gives a break of 3 after only 12 hours exposure.

LIGHT STABILITY OF 2,2-BIS(4-HYDROXYPHENYL)PROPANE POLYESTERS

| Sample | Acid component of polyester | Xenotester Exposure Rating | | |
|---|---|---|---|---|
| | | 24 hours | 48 hours | 100 hours |
| A | Dodecahydro-4,4'-bibenzoic acid | 5 | 5-4 | 4 |
| B | Bis(4-carboxycyclohexyl)methane | 5 | 5 | 5 |
| C | 2,2-bis(4-carboxycyclohexyl)propane | 5-4 | 4 | 4 |
| D | 1,2-bis(4-carboxycyclohexyl)ethane | 5 | 5-4 | 4 |

Since many different embodiments of the invention may be made without departing from the spirit and scope thereof, it is to be understood that the invention is not limited by the specific illustrations except to the extent defined in the following claims.

What is claimed is:

1. A moldable linear polymeric polyester consisting of recurring ester units of the structural formula

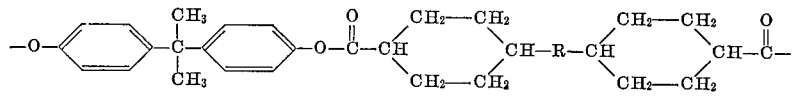

wherein R is a direct linkage or a divalent radical of the group consisting of methylene, ethylene and isopropylidene.

2. A moldable linear polymeric polyester having a polymer melting temperature of at least 250° C. and consisting of recurring ester units of the structural formula 3. A moldable linear polymeric polyester having a polymer melting temperature of at least 240° C. and consisting of recurring ester units of the structural formula 4. A moldable linear polymeric polyester having a polymer melting temperature of at least 250°C. and consisting of recurring ester units of the structural formula

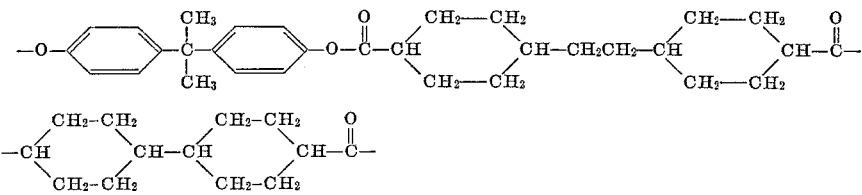

5. A moldable linear polymeric polyester having a polymer melting temperature of at least 260° C. and consisting of recurring ester units of the structural formula

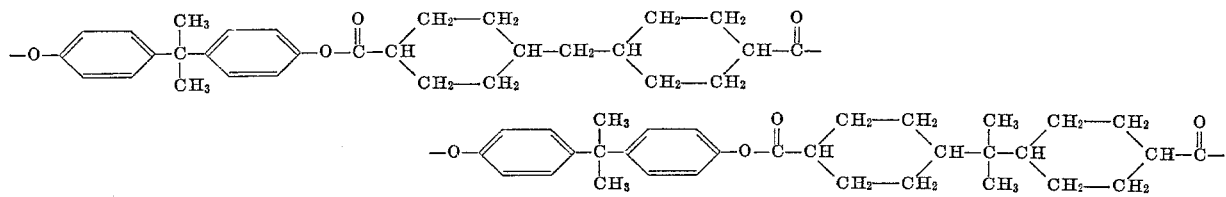

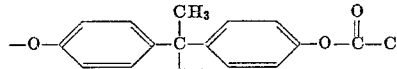

References Cited

UNITED STATES PATENTS

| | | |
|---|---|---|
| 3,007,900 | 11/1961 | Lytton. |
| 3,271,365 | 9/1966 | Parham. |
| 3,337,498 | 8/1967 | Hogsed et al. |

FOREIGN PATENTS

| | | |
|---|---|---|
| 723,219 | 12/1965 | Canada. |

WILLIAM H. SHORT, Primary Examiner

L. P. QUAST, Assistant Examiner

U.S. Cl. X.R.

260—33.8, 468, 514, 544